United States Patent [19]

Jäger

[11] 3,991,399
[45] Nov. 9, 1976

[54] CENTRAL WARNING DEVICE FOR VEHICLES

[75] Inventor: Heinz Jäger, Endersbach, Germany

[73] Assignee: Daimler-Benz Aktiengesellschaft, Germany

[22] Filed: Sept. 4, 1974

[21] Appl. No.: 502,945

[30] Foreign Application Priority Data

Sept. 6, 1973 Germany............................ 2344863

[52] U.S. Cl. ........................... 340/52 R; 180/82 R; 116/114 AE
[51] Int. Cl.² ........................................ B60K 26/00
[58] Field of Search...................... 340/52 R, 52 F; 180/103 R, 106, 82 R; 116/114 AE

[56] References Cited
UNITED STATES PATENTS 2,692,980  10/1954  Platt................................. 340/52 R
2,918,652  12/1959  Epstein ............................ 340/52 R
3,271,736   9/1966  Brown et al. ...................... 340/52 F

*Primary Examiner*—John W. Caldwell
*Assistant Examiner*—Joseph E. Nowicki
*Attorney, Agent, or Firm*—Craig & Antonelli

[57] ABSTRACT

A motor vehicle, especially a military vehicle, which is provided with a relatively narrow boarding entry directly surrounding the body of the driver and with a warning system for indicating the failure of auxiliary aggregates and/or of auxiliary media; a mechanical central warning device is connected in parallel with a central warning lamp which lights up each time an individual one of several warning lamps lights up, each indicating a predetermined failure; the mechanical warning device thereby transmits to the driver the warning by an increase in the pressure which must be exerted by the driver on the gas pedal for purposes of its displacement.

16 Claims, 4 Drawing Figures

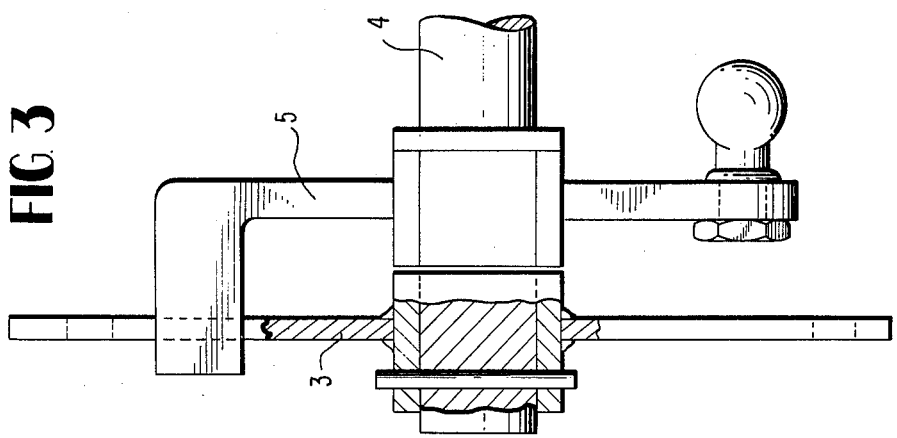
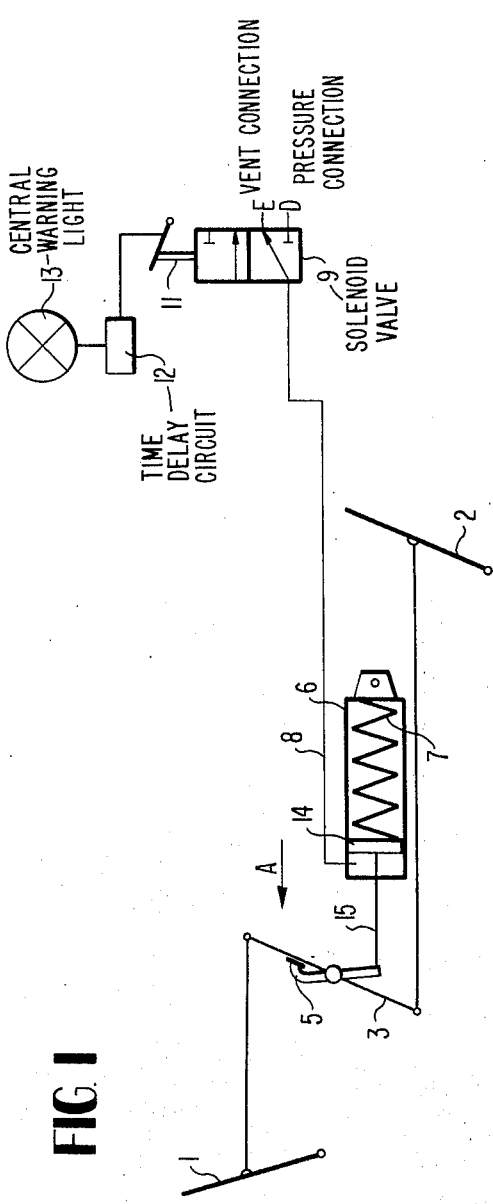
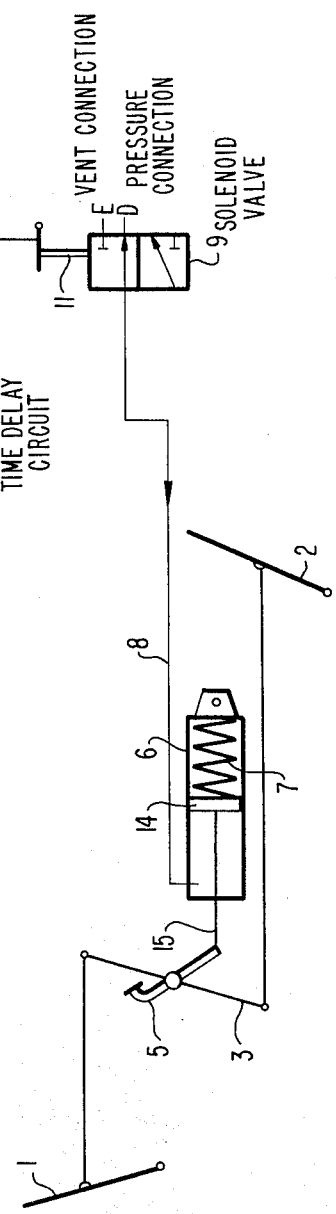

CENTRAL WARNING DEVICE FOR VEHICLES

The present invention relates to a motor vehicle, especially to a military vehicle, such as a tank, armored vehicle or the like with a narrow boaarding ingress or entry tightly surrounding the body of the vehicle and with a warning system for indicating the failure of auxiliary aggregates or of auxiliary media.

Such types of vehicles, in which the driver has little space because the edge of the boarding port is disposed closely around the body of the vehicle, are also referred to as tub-type vehicles. When driving on roads, the driver projects with a part of his upper body out of the small tub port and then has no view on the instruments arranged in the vehicle interior because his upper body then nearly completely fills out the port or opening. Even though optical warning devices are provided on the inside of the vehicle which each individually indicates the defect of a certain auxiliary aggregate or auxiliary means and even though a central warning lamp is provided which lights up each time an individual one of the warning lamps is lighted up, the driver nonetheless can recognize all of these optical warning devices only when he turns away his attention from the road traffic and creates the possibility by a particular positioning of his body to render recognizable the one or the warning light or the central warning light. It follows therefrom that the warning of the driver in case of a defect of any part of an aggregate or any medium represents a particular problem in so-called tub vehicles. An optical warning is also not possible and an acoustic additional driver warning system must also be rejected because it is also of no use in case of a defect since the military team is normally equipped with headsets for radio communication and therefore cannot additionally receive an acoustic signal.

It is the aim of the present invention to equip military tub vehicles with warning installations which in addition to the warning device, in particular, in addition to the optical warning device provided in the vehicle, calls the attention of the driver in another manner to the fact that a defect exists in the vehicle, an aggregate has failed or broken down or no brake pressure is any longer available.

The underlying problems are solved according to the present invention by mechanical means, and more particularly in that a mechanical central warning mechanism is connected in parallel with a central warning light which lights up each time an individual one of several warning lights lights up indicating respectively a predetermined failure, whereby the mechanical central warning mechanism transmits to the driver the warning by an increase of the pressure to be exerted on the gas pedal for purposes of its movement. Constructively, this warning mechanism may be so constructed that a drag lever is able to engage under the pressure of a spring either directly or indirectly at the gas pedal, which spring is compressed in a cylinder by a pneumatic or hydraulic pressure when the apparatus and media to be monitored are intact. The connection of the cylinder with a pressure source may thereby be established by way of a valve to be electrically or similarly actuatable, which upon failure of any of the connected apparatus to be monitored will be relieved or vented. The solenoid valve used thereby can be connected by way of a time delay relay which vents or relieves the solenoid valve only after a lapse of time of about three seconds after the lighting up of the central warning lamp. It is avoided thereby that with a short lighting up of the warning light the solenoid valve is immediately shifted, i.e., that a failure which is indicated by an initial flickering of the light is at first not yet mechanically transmitted to the gas pedal. It is also important in the reverse sense that the solenoid valve does not respond immediately if a failure no longer exists or has been eliminated. In order to achieve this, the time delay relay transmits the pulse for the solenoid valve concerning the proper functioning of the apparatus and media to be monitored for purposes of closing the valve and for establishing the connection between the pressure source and the cylinder only about one second after the central warning light becomes extinguished.

Accordingly, it is an object of the present invention to provide a motor vehicle, especially a military vehicle, which avoids by simple means the aforementioned shortcomings and drawbacks encountered in the prior art.

Another object of the present invention resides in a motor vehicle, especially in a military vehicle, which provides a readily recognizable indication of the existence of a failure or improper functioning without the need for relying on optical or acoustic recognition.

A further object of the present invention resides in a motor vehicle of the type described above which insures a proper warning to the driver of a vehicle, especially of a military vehicle, even though his visibility of the instrument panel or part thereof is obstructed by his body which nearly completely fills out the port hole through which he sticks out when driving the vehicle on a regular road.

Still another object of the present invention resides in a military vehicle which is simple in construction, can be easily installed into existing vehicles and is reliable in operation, regardless of the skill of the driver or his familiarity with the particular vehicle.

These and further objects, features and advantages of the present invention will become more apparent from the following description when taken in connection with the accompanying drawing which shows, for purposes of illustration only, one embodiment in accordance with the present invention and wherein:

FIG. 1 is a schematic view of the mechanical warning installation according to the present invention in conjunction with the gas pedals of the military motor vehicle, illustrated in the warning position thereof:

FIG. 2 is a schematic view, similar to FIG. 1, illustrating the warning installation of the present invention in the regular position in which all apparatus are functioning properly and a warning indication does not take place; and FIG. 3 is a partial, elevational view, taken in the direction of the arrow A in FIG. 1, on a part of the warning installation in accordance with the present invention.

Figure 1A:
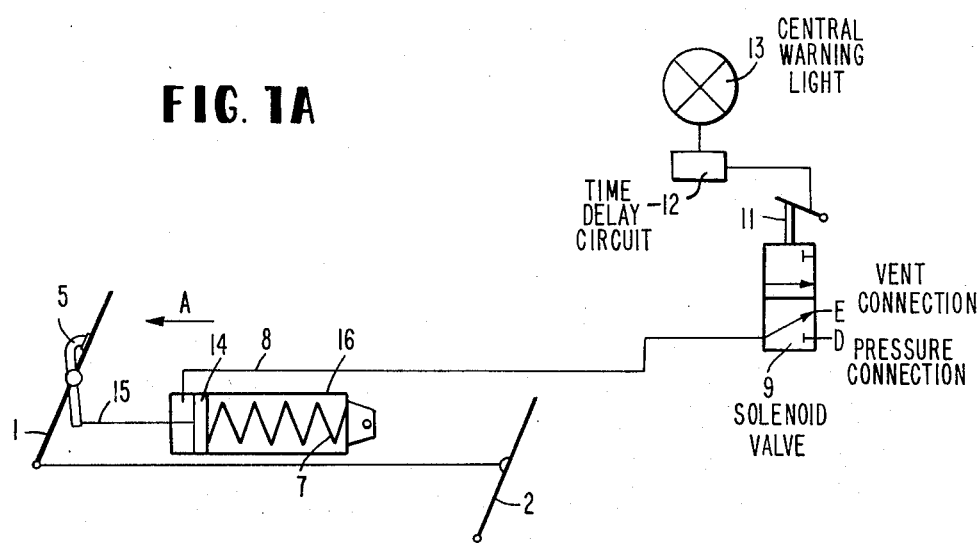
FIG. 1A is a schematic view of an example of a further embodiment according to the mechanical warning installation of FIG. 1, illustrated in the warning position.

Referring now to the drawing wherein like reference numerals are used throughout the various views to designate like parts, tub vehicles, especially reconnaissance vehicles, which are used in military service, can be driven forwards or backwards in such a manner that the driver can drive the vehicle in each case in the direction of view. Consequently, with such types of vehicles the gas pedals 1 and 2 are coupled with each other by way of a deflecting lever 3 so that the gas pedal 1 is available for the forward drive and the gas pedal 2 for the backward drive. For the realization of the present invention, a drag lever 5 is now mounted on the shaft 4 of the deflecting lever 3 (FIG. 3). This drag lever 5 can be caused to abut at the deflecting lever 3 by the spring 7 disposed in the cylinder 6. In addition, as shown in FIG. 1A, the drag lever 5 can be caused to abut directly against one of the gas pedals, such as gas pedal 1 for the forward drive. An air or hydraulic line 8 is connected with the cylinder 6 which in turn is connected with a pressure source (not shown) by way of the connection D of a solenoid valve 9. The solenoid valve 9 is controlled by an electromagnet 11. The electromagnet 11 is connected with a central warning light 13 of conventional type by way of a conventional time delay relay 12.

The warning signals transmitted electrically to the instruments indicate failures or troubles of the most varied aggregate and media in the vehicle. Thus, for example, the following failure or trouble sources may be indicated by means of individual warning lights 16, as illustrated in FIG. 2. Excessively low engine oil pressure; excessively high water temperature; inadequate cooling water; inadequate hydraulic oil; insufficient brake pressure; excessively high transmission oil temperature; excessively low transmission oil pressure; lack of compressed air; non-released handbrakes; warning indicating a predetermined minimum rest of fuel in the tank; insufficient tire pressure; and the like. Each of these individual warning signals is connected to the central warning lamp 13. In each case of any defect or trouble, the central warning light 13 therefore also lights up. The central warning light 13 is therefore connected by way of the timing relay 12 to the electromagnet 11 of the solenoid valve 9. If now a failure or trouble occurs anywhere, then together with the individual warning lamp also the central warning lamp 13 will light up. After the lapse of a predetermined delay of about three seconds, which is caused by the time delay relay 12, the warning pulse is also transmitted to the solenoid valve 9. The latter, while being energized, vents the cylinder 6 by way of the line 8 and the connection E, whose spring loaded piston 14 is connected by way of a linkage 15 and drag lever 5 with the transmission elements of the gas control, i.e., which means, it is able to press by means of the drag lever 5 against the deflection lever 3 (FIG. 1). Upon relieving or venting the piston 14, the spring installed in the cylinder 6 therefore acts on the gas pedal and thereby requires a clearly noticeable increased pedal force on the part of the driver. The driver's attention is directed by this effect to the fact that something is not in order somewhere in the vehicle. He can now determine which of the individual warning lamps lights up and which aggregate has failed or which medium is lacking.

The force acting on the foot of the driver by way of the gas pedal 1, however, is so metered that it can be overcome in case of need notwithstanding the warning. As a result thereof, the vehicle can be accelerated to its full driving speed notwithstanding the presence of a warning force. However, the driver will always notice the larger force at the gas pedal which is larger than the force to which he is normally accustomed, if the failure or trouble has not been eliminated and therefore continues to be warned in such emergency cases for such length of time until the failure or trouble in the vehicle is eliminated. After the elimination of the failure or trouble, the electromagnet 11 of the solenoid valve 9 again is de-energized, the pressure space of the cylinder 6 is again acted upon with compressed air in the position of the solenoid valve 9 illustrated in FIG. 2, the piston acts against the spring force, thus cancels the same and the driver notices at the gas pedal again the customary accustomed resistance. The signal "failure source eliminated" to the central warning light will be transmitted also to the solenoid valve 11 only after a delay of about one second which is achieved again by conventional means, such as timing relay 12.

The warning system has been used with great success in the development of a new reconnaissance tank whereby the vehicle damages compared to prior test drives could be considerably reduced. The warning system according to the present invention additionally has also proved itself when used with troops having inexperienced drivers and represented especially for the latter a great assist in the handling of a vehicle which was substantially unknown to new recruits and with which they had little practice, especially with respect to occurring troubles.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. In a vehicle of the type having at least one gas pedal, narrow boarding means for entering the vehicle and warning means for indicating a failure of at least one of auxiliary components and conditions representative of proper operating functions of the vehicle, said warning means including a plurality of individual warning lights, each of said warning lights indicating a predetermined failure of one of said components or conditions, the improvement comprising said warning means further including a central warning light means for indicating all predetermined failures, and mechanical warning means responsive to operation of said central warning light means for transmitting a warning of each predetermined failure to an operator of the vehicle by an increase of pressure to be exerted on said gas pedal.

2. A motor vehicle according to claim 1, characterized in that the vehicle is a tub-type military vehicle.

3. A motor vehicle according to claim 1, characterized in that the boarding means closely surrounds the body of the vehicle operator such that he is prevented from viewing said warning lights.

4. A motor vehicle according to claim 1, characterized in that said mechanical warning means include a cylinder, spring means being compressed by fluid pressure within said cylinder, and drag lever means operable to apply to the gas pedal the pressure of said spring means being under compression of said fluid pressure when the components and conditions to be monitored are in order.

5. A motor vehicle according to claim 4, characterized in that the drag lever means engages the gas pedal directly.

6. A motor vehicle according to claim 4, characterized in that the drag lever means engages at the gas pedal indirectly.

7. A motor vehicle according to claim 4, characterized in that the fluid pressure is a pneumatic pressure.

8. A motor vehicle according to claim 4, characterized in that the fluid pressure is a hydraulic pressure.

9. In a vehicle of the type having at least one gas pedal, narrow boarding means for entering the vehicle and warning means for indicating a failure of at least one of auxiliary components and conditions representative of proper operating functions of the vehicle, said warning means including a plurality of individual warning lights, each of said warning lights indicating a predetermined failure of one of said components or conditions, the improvement comprising said warning means further including a central warning light means for indicating all predetermined failures, and mechanical warning means responsive to operation of said central warning light means for transmitting a warning of each predetermined failure to an operator of the vehicle by an increase of pressure to be exerted on said gas pedal, wherein said mechanical warning means include a cylinder, spring means being compressed by fluid pressure within said cylinder, and drag lever means operable to apply to the gas pedal the pressure of said spring means being under compression of said fluid pressure when the components and conditions to be monitored are in order, and wherein the connection of the cylinder with a pressure source is established by way of a valve means which cylinder is relieved of pressure by said valve means in case of failure of any of said components or conditions.

10. A motor vehicle according to claim 9, characterized in that the valve means is electromagnetically actuatable.

11. A motor vehicle according to claim 9, characterized in that the valve means is a solenoid valve which is connected with the central warning light means by way of a time relay means which shifts the valve means into a position of pressure relief only after a predetermined lapse of time after the lighting up of the central warning light means.

12. A motor vehicle according to claim 11, characterized in that said predetermined lapse of time is about three seconds.

13. A motor vehicle according to claim 11, characterized in that the time relay means is operable to transmit a pulse to the valve means representative of the proper functioning of the components or conditions to be monitored for controlling the valve means and establishing the connection between the pressure source and the cylinder only after a predetermined time subsequent to the response of the central warning light means.

14. A motor vehicle according to claim 13, characterized in that said predetermined time is about one second.

15. A motor vehicle according to claim 9, characterized in that a time relay means is operable to transmit a pulse to the valve means representative of the proper functioning of the components or conditions to be monitored for controlling the valve means and establishing the connection between the pressure source and the cylinder only after a predetermined time subsequent to the response of the central warning light means.

16. A motor vehicle according to claim 15, characterized in that said predetermined time is about one second.

* * * * *